(12) United States Patent
Skiba et al.

(10) Patent No.: US 6,615,114 B1
(45) Date of Patent: Sep. 2, 2003

(54) CALIBRATION SYSTEM AND METHOD FOR WORK MACHINES USING ELECTRO HYDRAULIC CONTROLS

(75) Inventors: Richard J. Skiba, Peoria, IL (US); Kenneth L. Stratton, Dunlap, IL (US); Jean-Jacques Clar, Tremont, IL (US); Steven R. Genseal, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/464,469

(22) Filed: Dec. 15, 1999

(51) Int. Cl.⁷ ............... G05B 13/00; G01L 25/00
(52) U.S. Cl. ............... 700/275; 73/1.01; 172/2; 700/254; 700/301; 701/50; 702/105
(58) Field of Search ............... 700/32, 33, 56, 700/57, 60–64, 85, 90, 250, 254, 275, 281, 282, 301, 302; 37/234, 902; 702/85, 105, 94; 701/50; 172/2, 3, 9, 10; 73/1.01

(56) References Cited

U.S. PATENT DOCUMENTS

| | | | |
|---|---|---|---|
| 4,776,750 A | 10/1988 | Griswold, Jr. et al. | 414/698 |
| 4,898,333 A | 2/1990 | Kime et al. | 239/657 |
| 4,931,967 A * | 6/1990 | Boe et al. | 702/94 |
| 5,170,342 A | 12/1992 | Nakamura et al. | 700/65 |
| 5,265,356 A | 11/1993 | Winter | 37/234 |
| 5,274,557 A * | 12/1993 | Moriya et al. | 701/50 |
| 5,438,771 A | 8/1995 | Sahm et al. | 37/348 |
| 5,446,980 A | 9/1995 | Rocke | 37/348 |
| 5,493,798 A | 2/1996 | Rocke et al. | 37/348 |
| 5,528,843 A | 6/1996 | Rocke | 37/348 |
| 5,535,532 A | 7/1996 | Fujii et al. | 37/348 |
| 5,623,093 A * | 4/1997 | Schenkel et al. | 73/1.01 |
| 5,659,985 A | 8/1997 | Stump | 37/348 |
| 5,832,637 A | 11/1998 | Aguado et al. | 37/234 |
| 5,899,007 A | 5/1999 | Niemela et al. | 37/281 |
| 5,918,195 A * | 6/1999 | Halgrimson et al. | 702/94 |
| 6,076,030 A * | 6/2000 | Rowe | 701/50 |
| 6,256,566 B1 * | 7/2001 | Kamiya et al. | 701/50 |
| 6,401,456 B1 * | 6/2002 | Moriya et al. | 60/433 |

* cited by examiner

Primary Examiner—Leo Picard
Assistant Examiner—Paul Rodriguez
(74) Attorney, Agent, or Firm—Blackwell Sanders Peper Martin LLP (57) ABSTRACT

A calibration system for use on a work machine wherein electro hydraulic controls are utilized to control the operation of a particular work element, the present calibration system being operable in both a semi-automatic mode and an automatic mode. In the semi-automatic mode, operator interaction is required and the calibration process is preferably initialized and controlled via a service tool which is in communication with a work machine controller. A command signal having a command signal value indicative of a command state of the component being calibrated is generated by a command signal generator, and a detector in communication with the component receives the component signal and detects when the component has reached the command state, and generates a detector signal having a value representing a calibration factor to be used in correlating the component signal value with the actual state of the component. In the automatic mode, no operator interaction is required and the controller automatically and dynamically correlates and compares the current state of the particular component being calibrated with its last stored state and thereafter calibrates the component upon detecting a difference therebetween.

6 Claims, 3 Drawing Sheets

CALIBRATION SYSTEM AND METHOD FOR WORK MACHINES USING ELECTRO HYDRAULIC CONTROLS

TECHNICAL FIELD

This invention relates generally to a calibration system and method therefor and, more importantly, to a calibration system and method for work machines using electro hydraulic controls.

BACKGROUND ART

Many work machines use electro hydraulics to control a wide variety of different work elements connected thereto. The precise control of such work elements is useful not only with respect to the accuracy and degree of efficiency in accomplishing the particular work application, but also when the functioning of the implement is automatically controlled. Unfortunately, the various components used to control such work elements are subject to wear and tear over time, thereby reducing their accuracy. This is exacerbated by the rugged conditions under which work machines are typically used. In addition, since several components are typically used in combination to control any given work element, their tolerances tend to "stack up", thereby decreasing an operator's ability to accurately control the work element. This lack of control also causes unnecessary wear and tear on the work element itself, thereby reducing its effectiveness, further shortening the work element's life span, and increasing the overall costs for maintaining the work machine.

In some cases, the control accuracy of the implement or work element can be improved by using low tolerance components. However, such components are expensive. Moreover, they too are subject to wear and tear and, as a result, cannot provide a long-term solution. The accuracy of the control of the work element can also be improved by simply replacing components whose tolerances exceed a proper level. However, such a replacement strategy is very expensive and results in a lot of wasted components. Moreover, it requires continuous monitoring of the components and work elements to determine when they should be replaced, and given such human intervention, it increases the risk that a component or work element is not replaced when necessary.

Accordingly, the present invention is directed to overcoming one or more of the problems as set forth above.

DISCLOSURE OF THE INVENTION

A calibration system for a work machine using an electro hydraulic valve to control the operation of a work element via a hydraulic circuit which includes various detectors, such as sensors positioned in communication with components of the work machine for detecting the state of the components and an actuator coupled to the work element for controlling the operation thereof is disclosed.

In one aspect of the present invention, the calibration system comprises use of a service tool such as a laptop computer adapted to generate a calibration initialization signal and further comprises a controller positioned in communication with the service tool and the various relevant sensors, the controller being operable to receive the calibration initialization signal from the service tool and output appropriate signals to the relevant components. In this regard, the controller includes a command signal generator for generating a command signal having a command value for transmission to the relevant component upon receipt of the calibration initialization signal. The detector detects when the component has reached the command state and generates a detector signal having a value representing a calibration factor to be used in correlating the detector signal value with the actual state of the component.

In another aspect of the present invention, the controller is adapted to automatically and dynamically calibrate various components of the work machine without input from a service tool. With respect to the operator input device which is adapted to move through a plurality of travel angles from a neutral position to a corresponding plurality of operator input device positions for controlling movement of the work element and which outputs an operator input device signal having an operator input device signal value indicative of the position of the operator input device, the controller includes a storage mechanism for storing the plurality of travel angles of the operator input device. The controller also includes a correlation mechanism in communication with the operator input device which is adapted to receive the operator input device signal for correlating the received signal with a travel angle of the operator input device. The comparator is in communication with the correlation mechanism and the storage mechanism and continuously compares the correlated travel angle at each limit position of the operator input device with the corresponding last stored travel angle for that particular limit position. The detector of the controller is in communication with the comparator and detects differences between the compared correlated travel angle and the compared last stored travel angle, the controller storing the compared correlated travel angle within the storage mechanism such that accurate control of the operator input device is achieved.

In yet another embodiment of the automatic calibration embodiment of the present invention, an actuator mechanism position sensor is positioned in communication with the actuator mechanism for sensing a position of the actuator mechanism, and outputs an actuator mechanism position sensor signal having an actuator mechanism position sensor signal value indicative of the travel distance of the actuator mechanism. The controller is in communication with the actuator mechanism position sensor and is likewise adapted to automatically and dynamically calibrate the actuator mechanism position sensor. Specifically, the storage mechanism of the controller stores a plurality of travel distances for the corresponding limit positions of the actuator mechanism. The correlation mechanism, which is in communication with the actuator mechanism position sensor and receives the actuator mechanism position sensor signal, correlates the actuator mechanism position sensor signal with a travel distance of the actuator mechanism. The comparator, which is in communication with the correlation means and the storage means, compares the correlated travel distance associated with each limit position of the actuator mechanism with the corresponding last stored travel distance for that particular limit position, while the detector detects differences between the compared correlated travel distance and the compared last stored travel distance. The controller stores the compared correlated travel distance within the storage mechanism of the controller such that accurate control of the actuator mechanism is also achieved.

In yet a further embodiment of the automatic calibration embodiment of the present invention, wherein the work machine includes a pressure sensor positioned in communication with the control valve for sensing a pressure being exerted against the actuating cylinder and outputting a pressure sensor signal having a pressure sensor signal value indicative of the sensed pressure, the controller, which is in communication with the pressure sensor, automatically and dynamically calibrates the pressure sensor signal value to the value of the atmospheric pressure when the hydraulic system pressures are discharged and are at or near atmospheric pressure. In particular, the storage mechanism stores a predetermined atmospheric pressure; the comparator, which is in communication with the pressure sensor, compares the stored atmospheric pressure to the pressure sensor signal value of the received pressure sensor signal when the system is at or near atmospheric pressure; the detector detects differences between the stored atmospheric pressure and the compared pressure sensor signal value when the system is at or near atmospheric pressure; and the calculator calculates an atmospheric pressure calibration factor representing the detected difference such that accurate control of the pressure sensor is achieved.

In another aspect of the present invention, the controller is adapted to automatically and dynamically calibrate various components of the work machine without input from a service tool. With respect to the operator input device which is adapted to move through a plurality of travel angles from a neutral position to a corresponding plurality of operator input device positions for controlling movement of the work element and which outputs an operator input device signal having an operator input device signal value indicative of the position of the operator input device, the controller includes a storage mechanism for storing the plurality of travel angles of the operator input device. The controller also includes a correlation mechanism in communication with the operator input device which is adapted to receive the operator input device signal for correlating the received signal with a travel angle of the operator input device. The comparator is in communication with the correlation mechanism and the storage mechanism and continuously compares the correlated travel angle at each limit position of the operator input device with the corresponding last stored travel angle for that particular limit position. The controller stores the compared correlated travel angle within the storage mechanism.

In yet another embodiment of the automatic calibration embodiment of the present invention, an actuator mechanism position sensor is positioned in communication with the actuator mechanism for sensing a position of the actuator mechanism, and outputs an actuator mechanism position sensor signal having an actuator mechanism position sensor signal value indicative of the travel distance of the actuator mechanism. The controller is in communication with the actuator mechanism position sensor and is likewise adapted to automatically and dynamically calibrate the actuator mechanism position sensor. Specifically, the storage mechanism of the controller stores a plurality of travel distances for the corresponding limit positions of the actuator mechanism. The correlation mechanism, which is in communication with the actuator mechanism position sensor and receives the actuator mechanism position sensor signal, correlates the actuator mechanism position sensor signal with a travel distance of the actuator mechanism. The comparator, which is in communication with the correlation means and the storage means, compares the correlated travel distance associated with each limit position of the actuator mechanism with the corresponding last stored travel distance for that particular limit position. The controller stores the compared correlated travel distance within the storage mechanism of the controller such that accurate control of the actuator mechanism is also achieved.

In yet a further embodiment of the automatic calibration embodiment of the present invention, wherein the work machine includes a pressure sensor positioned in communication with the control valve for sensing a pressure being exerted against the actuating cylinder and outputting a pressure sensor signal having a pressure sensor signal value indicative of the sensed pressure, the controller, which is in communication with the pressure sensor, automatically and dynamically calibrates the pressure sensor signal value to the value of the atmospheric pressure when the hydraulic system pressures are discharged and are at or near atmospheric pressure. In particular, the storage mechanism stores a predetermined atmospheric pressure; the comparator, which is in communication with the pressure sensor, compares the stored atmospheric pressure to the pressure sensor signal value of the received pressure sensor signal when the system is at or near atmospheric pressure; the calculator calculates an atmospheric pressure calibration factor.

BRIEF DESCRIPTION OF THE DRAWINGS

For a better understanding of the present invention, reference may be made to the accompanying drawings in which.

BEST MODE FOR CARRYING OUT THE INVENTION

Figure 1:
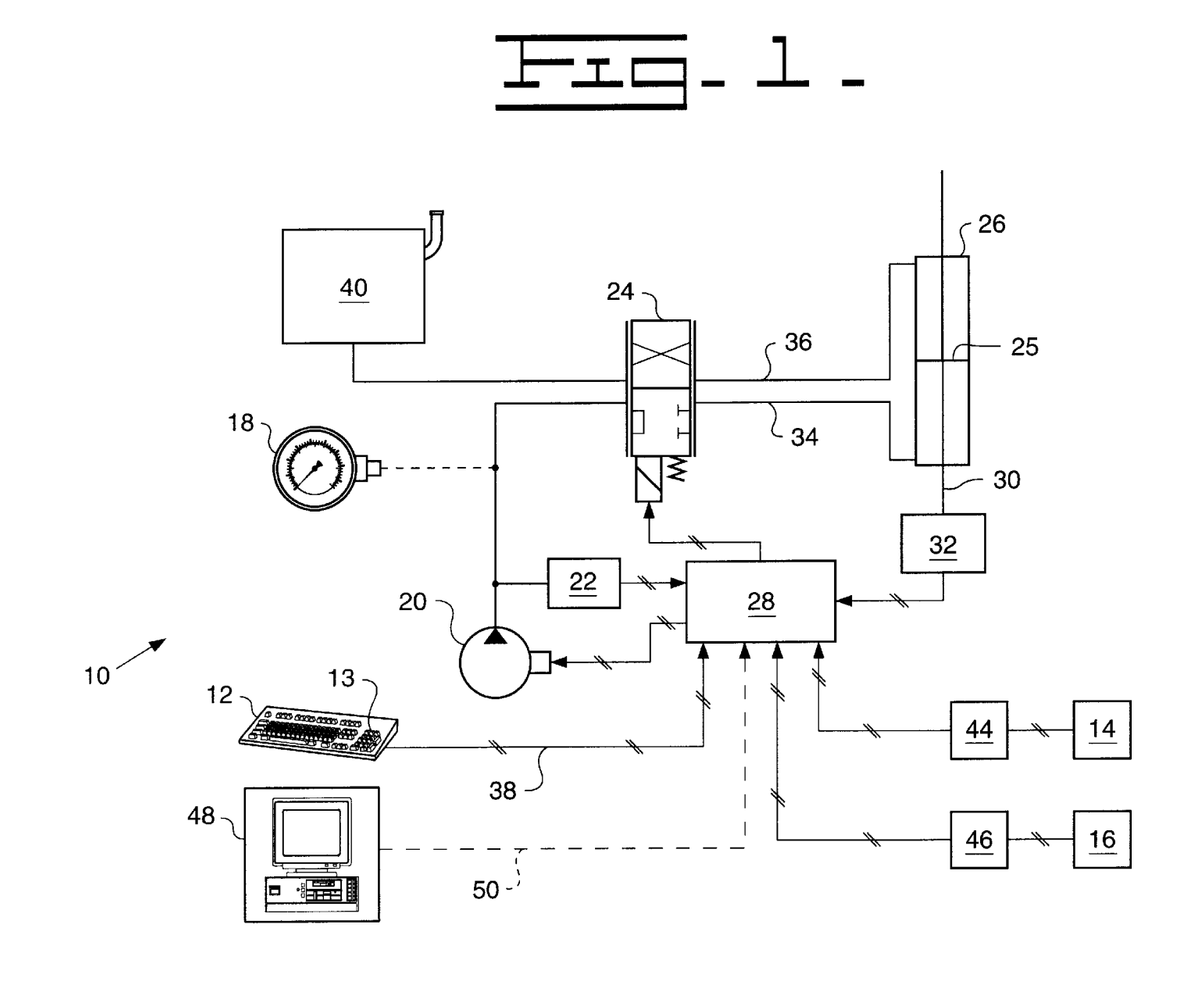
FIG. 1 is a block diagram of one embodiment of the calibration system of the present invention.

Referring to FIG. 1, various components associated with a work machine having a hydraulic circuit, such as a front end loader or bulldozer, are illustrated in diagrammatic form. FIG. 1 represents the various components associated with one embodiment of the present calibration system 10. In general, a typical work machine includes several work elements which are controlled via electro hydraulic control valves connected respectively thereto through one or more hydraulic circuits (not shown). In this regard, one or more hydraulic pumps such as pump 20 will supply hydraulic fluid under pressure to the various electro hydraulic control valves such as control valve 24. The operation of these valves are typically controlled electrically through the use of an electronic controller or other processing means such as controller 28 which outputs appropriate signals to the actuating means of the control valves to control the flow and/or pressure to an actuating cylinder, a motor, or other actuator means coupled to a particular work element.

While the present invention will now be described with respect to a work machine comprising the components as shown in FIG. 1 with the actuator means represented by an actuating cylinder 26, it can be appreciated by one skilled in the art that the present invention can be used in connection with any type of work machine having any type of work elements controlled through the use of electro hydraulics. As shown in FIG. 1, an electro hydraulic control valve 24 will meter an appropriate amount of hydraulic fluid supplied from hydraulic pump 20 to and from actuating cylinder 26 via a plurality of fluid paths 34 and 36. Valve 24 controls the movement of a particular work element (not shown) coupled to the actuating cylinder 26 in response to appropriate signals inputted to valve 24 via an electronic controller 28. Controller 28 is likewise coupled to appropriate operator input control devices such as the control handles 14 and 16 illustrated in FIG. 1. The cylinder 26 is connected in fluid communication to control valve 24 in a conventional manner and includes a movable piston 25 located therein. The piston 25 may be connected in a conventional manner to any appropriate implement or work element associated with a particular work machine. The cylinder 26 will move between a fully extended position and a fully retracted position to control movement of the associated work element.

A position sensor 32 is coupled to the cylinder 26 so as to sense the position of the piston 25 within the cylinder 26 as the piston moves axially therewithin. In one embodiment, the position sensor 32 is a magnetostrictive sensor. Position sensors are well known in the industry and may include a variety of known linear sensors, resolvers, and radio frequency or ultrasonic sensors, as well as various encoding systems which utilize both incremental codes and absolute codes for determining the position of a wide variety of elements along a path of movement. Position sensor 32 is operatively coupled to an electronic control module (ECM) or other controller or processor 28 and outputs a signal to controller 28 indicative of the position of the piston 25 within the cylinder 26. The position of the control valve 24 vis-à-vis fluid paths 34 and 36 dictates how much, if any, hydraulic fluid flows therethrough.

A typical work machine includes a mainframe or main body portion which may include an operator cab (not shown) from which an operator may control directional movement of the machine, and the operation and movement of the work elements coupled thereto. The operator cab includes operator input control devices such as various control handles or electronic joy sticks which generate respective operator input signals used to control the operation and movement of the work elements coupled thereto. The signals outputted by electronic controller 28 to valve 24 are produced in response to operator input signals generated by activation of such operator input control mechanisms, as well as in response to inputs from hydraulic pressure sensor 22 and cylinder position sensor 32. Such input control mechanisms may include a keypad 12, a blade control handle 14, a ripper control handle 16, or a wide variety of other mechanisms.

Keypad 12 as shown in FIG. 1 includes keys 13 for inputting data relating to various operational parameters associated with the work machine or with a particular work application. Upon activation of keys 13, an operator input signal 38 is generated for transmission to controller 28. It can be appreciated by one skilled in the art, however, that any type of input control mechanism capable of generating an operator input signal, such as a touch screen, may be used.

Figure 3:
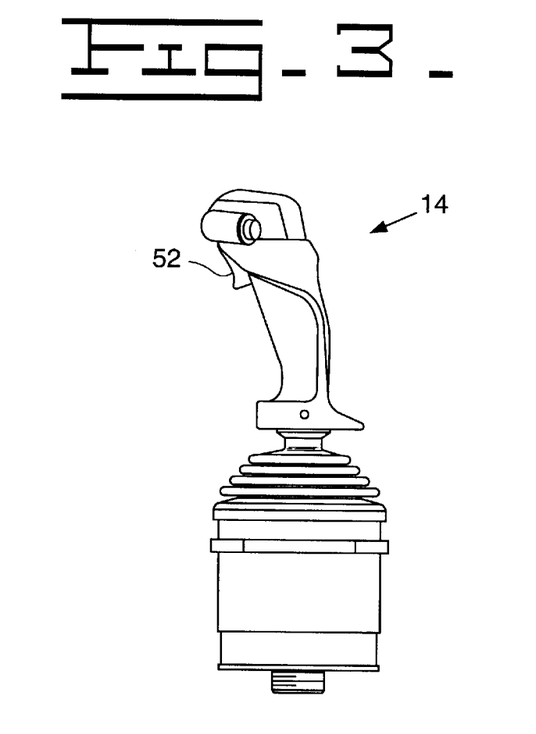
FIG. 3 is a perspective view of one embodiment of the blade control handle referenced in FIGS. 1 and 2.

In one embodiment, a blade control handle 14 controls the movement of a blade (not shown) which is coupled to an actuating cylinder 26. With further reference to FIG. 3, blade control handle 14 is configured to move through a plurality of different travel angles from a central neutral position. Each travel angle corresponding to a particular blade control handle position. In a preferred embodiment, the plurality of blade control handle positions include the forward, reverse, left and right positions. Blade control handle 14 also includes a blade control handle trigger 52 which, when activated by the operator, is used as a blade handle position marker in the cylinder position sensor calibration process as will be hereinafter further explained. Upon movement of blade control handle 14 between its forward, reverse, left or right positions, a blade control handle operator input signal representing such movement is generated for transmission to controller 28. A blade control handle sensor 44 is placed in communication with both handle 14 and controller 28 for sensing the blade control handle operator input signal generated and transmitted by handle 14 to controller 28.

Figure 4:
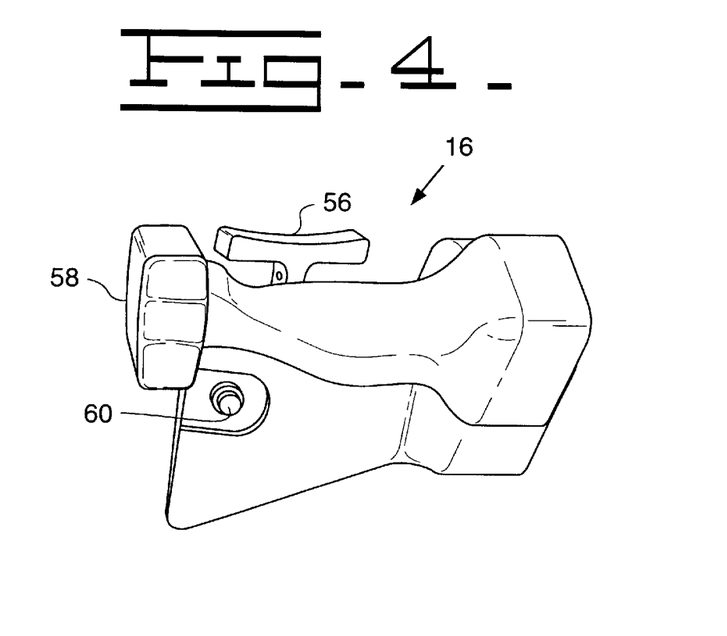
FIG. 4 is a perspective view of one embodiment of the ripper control handle referred in FIGS. 1 and 2.

In one embodiment, a ripper control handle 16 controls the movement of a ripper (not shown) which would likewise be associated with an actuating cylinder such as cylinder 26. With further reference to FIG. 4, ripper control handle 16 includes two ripper control levers, a first ripper control lever 56 for controlling movement of the ripper between a plurality of "in" and "out" positions, and a second ripper control lever 58 for controlling movement of the ripper between a plurality of "up" and "down" positions. It can be appreciated by one skilled in the art, however, that the first and second ripper control levers 56 and 58 could be combined or that a totally different ripper control handle configuration could be used. Upon movement of ripper control handle 16 between the "in", "out", "up" and "down" positions, a ripper control handle operator signal representing such movement is generated for transmission to controller 28. A ripper control handle sensor 46 is placed in communication with both the handle 16 and controller 28 for sensing the ripper control handle operator input signal generated and transmitted by handle 16 to controller 28.

Referring back to FIG. 1, hydraulic pressure sensor 22 is also placed in fluid communication with fluid path 34 for sensing the hydraulic pressure being exerted against cylinder 26, and responsively generating a hydraulic pressure sensor signal indicative thereof. Hydraulic pressure sensor 22 is in communication with controller 28 for transmitting the hydraulic pressure sensor signal thereto. It is recognized and anticipated that any plurality of pressure sensors 22 may be associated with a particular work machine.

In one embodiment, a controller 28 is placed in communication with valve 24 to control the operation of valve 24 based upon the operator input signals. The hydraulic pressure sensor signal and the cylinder position sensor signal may also be used in controlling the operation of valve 24. Controller 28 includes memory (not shown) for storing software which provides for the calibration of various components of the work machine based upon such signals. In a preferred embodiment, controller 28 provides a valve calibration process for calibrating control valve 24, a cylinder position sensor calibration process for calibrating cylinder position sensor 32, a hydraulic pressure sensor calibration process for calibrating hydraulic pressure sensor 22, a blade control handle calibration process for calibrating blade control handle 14, and a ripper control handle calibration process for calibrating ripper control handle 16. Controller 28 is configured to provide semi-automatic calibration, where operator interaction is desired to perform the calibration, or to provide automatic calibration where no operator interaction is desired and the work machine performs certain calibration processes automatically whenever certain operating conditions are met.

Semi-Automatic Calibration

With respect to semi-automatic calibration, the calibration process is preferably initialized and controlled via a service tool 48 which is in communication with controller 28. As shown in FIG. 1, service tool 48 is a laptop computer which communicates with controller 28 via a data link 50. Alternatively, service tool 48 can be implemented via an operator input mechanism such as keys 13 on keypad 12, or any other input device capable of communicating with controller 28, such as a touch screen. For the purposes of discussion, semi-automatic calibration using service tool 48 in the form of a laptop computer will be assumed. In particular, an operator of service tool 48 selects a calibration program stored thereon representing the desired calibration process, and transmits a calibration initialization signal to controller 28 to initialize the selected calibration program. Controller 28 may verify that certain pre-calibration conditions are met before the calibration process is allowed to begin. The pre-calibration conditions vary depending upon the calibration program selected. If any of the required pre-calibration conditions are not verified by controller 28, the selected calibration process is aborted. Controller 28 may also verify that the calibration factors determined through the calibration process are within a certain expected range before they are accepted.

1. Semi-Automatic Valve Calibration

The semi-automatic calibration of control valve 24 will now be described. A calibration initialization signal is generated by service tool 48 and transmitted to controller 28. Upon receipt of the calibration initialization signal, controller 28 verifies that certain pre-calibration conditions are met before the calibration process is allowed to begin. In particular, the engine of the work machine should be running and set to high idle, the hydraulic oil temperature should be in the operation temperature range, and the work element associated with valve 24 should be empty of materials. If these pre-calibration conditions are not verified by controller 28, the valve calibration process is aborted.

If, on the other hand, these pre-calibration conditions are verified, controller 28 then generates and transmits a valve command signal having a valve command value to valve 24 to electronically enable the hydraulic system to move the work element attached to the actuating cylinder 26. This is specifically accomplished by increasing the valve command value of the signal to valve 24 so as to cause initial movement of the work element. In this embodiment, the controller 28 increases current to actuating valve 24 to produce the desired movement of the work element. Initial movement of the work element can be detected by the controller 28 via a plurality of detectors, such as cylinder position sensor 32, pressure sensor 22 or simply by an operator monitoring the movement of the work element and pushing the blade control handle trigger 52 of blade control handle 14 once initial movement of the work element has been detected. A proper value and/or shape of the signal waveform from either the hydraulic pressure sensor 22 and/or the cylinder position sensor 32 may be used to detect when initial movement of the work element has begun. Once a signal representing initial movement of the work element is detected by either sensor, the valve command value of the command signal which produced such initial movement is stored within the memory of controller 28, and is used as a calibration point to initialize movement of the work element.

2. Semi-Automatic Cylinder Position Sensor Calibration

The semi-automatic calibration of cylinder position sensor 32 will now be described. The cylinder position sensor calibration process may include two parts, namely, calibration of cylinder 26 in a fully extended position and calibration of cylinder 26 in a fully retracted position. A calibration initialization signal is generated by service tool 48 and transmitted to controller 28. Upon receipt of the calibration initialization signal, controller 28 again verifies certain pre-calibration conditions before the calibration process is allowed to begin. In particular, the engine of the work machine should be running and set to high idle, and the hydraulic oil temperature should be in the operation temperature range. If these pre-calibration conditions are not verified by controller 28, the cylinder position sensor calibration process is aborted.

If, on the other hand, these pre-calibration conditions are verified, controller 28 generates and transmits a command signal to fully extend cylinder 26, this signal having a fully extended cylinder command value. The signal representing cylinder 26 in its fully extended position can be recognized by the controller 28 via a plurality of detectors, such as cylinder position sensor 32, pressure sensor 22, or simply by an operator monitoring the position of the work element and pushing the blade control handle trigger 52 of blade control handle 14 once the velocity or position of the work element is at a zero state. The signal from either the cylinder position sensor 32, pressure sensor 22 or blade control handle 14 can be differentiated by the controller 28 to detect when the velocity of the cylinder 26 is zero. Once a signal representing cylinder 26 in a fully extended position is generated by cylinder position sensor 32, pressure sensor 22 or blade control handle 14, its value is stored within the memory of controller 28. Controller 28 uses this value as a fully extended cylinder calibration factor for correlating the cylinder position sensor value with the actual fully extended position of cylinder 26.

Controller 28 also performs a similar calibration process with respect to moving cylinder 26 to its fully retracted position. In particular, upon receipt of the proper calibration initialization signal and verification of the pre-calibration conditions, controller 28 generates and transmits a fully retracted cylinder command signal having a fully retracted cylinder command value to cylinder 26. Once again, a signal representing cylinder 26 in a fully retracted position can be recognized by the controller 28 by sensing the signal generated by cylinder position sensor 32, pressure sensor 22, or blade control handle 14 in a manner as described above with respect to a fully extended cylinder 26. Once such a signal is sensed, its value is stored within the memory of controller 28. Controller 28 uses this value as a fully retracted cylinder calibration factor for correlating the cylinder position sensor value with the actual fully retracted position of cylinder 26. Once the fully extended and fully retracted positions of cylinder 26 are calibrated and captured, the controller 28 can calculate all points in between based upon a straight line correlation, or based upon any other correlation programmed into the controller 28.

3. Semi-Automatic Hydraulic Pressure Sensor Calibration

The semi-automatic calibration of the hydraulic pressure sensor 22 will now be described. The calibration may include two parts, namely calibration of the hydraulic system relief pressure, and calibration of the atmospheric pressure. With respect to the calibration of the hydraulic system relief pressure, once controller 28 receives a calibration initialization signal from service tool 48, controller 28 verifies that certain pre-calibration conditions are met before the calibration process is allowed to begin. In particular, the engine of the work machine should be running and set to high idle, and the hydraulic oil temperature should be in the operation temperature range. If these pre-calibration conditions are not verified by controller 28, the hydraulic pressure sensor calibration process is aborted.

If, on the other hand, these pre-calibration conditions are verified, controller 28 generates and transmits a relief pressure command signal having a relief pressure command value to hydraulic pump 20, and increases this signal until the hydraulic pressure of the fluid flowing to valve 24 reaches a relief pressure at which time a relief valve (not shown) positioned in communication with cylinder 26 opens to prevent a further increase in hydraulic pressure to cylinder 26. In a preferred embodiment, the relief pressure is a predetermined pressure. Use and actuation of a pressure relief valve is well known in the art and prevents damage to the control valve 24 and/or cylinder 26. Obtaining the pressure reading which triggers the opening of the relief valve is accomplished through the use of an external pressure gauge 18 which is coupled to the system at the appropriate location to read this pressure. The gauge relief pressure value measured and displayed by pressure gauge 18 is then read by the operator and inputted into service tool 48, which, in turn, generates a gauge relief pressure signal having the gauge relief pressure value transmitted to controller 28 via data link 50. Controller 28 then compares the gauge relief pressure value with the hydraulic pressure sensor signal value received from hydraulic pressure sensor 22 when the predetermined relief pressure is reached, and calculates a relief pressure calibration factor which correlates the gauge relief pressure value to the hydraulic pressure sensor value when the predetermined relief pressure is reached.

With respect to calibration for hydraulic system atmospheric pressure, once controller 28 receives a calibration initialization signal from service tool 48, controller 28 again verifies that certain pre-calibration conditions are met before the calibration process is allowed to begin. In particular, the engine of the work machine should be off, the hydraulic oil temperature should be in the operation temperature range, and the oil pressure should be discharged in the implements and the hydraulic tank 40. If these pre-calibration conditions are not verified by controller 28, the hydraulic pressure sensor calibration process is aborted.

If, on the other hand, these pre-calibration conditions are verified, the particular work machine is set at a state where the system pressure is at or near the atmospheric pressure once controller 28 receives the calibration initialization signal from service tool 48. Once set, controller 28 then stores the pressure sensor signal value of the pressure sensor signal transmitted to it by hydraulic pressure sensor 22, which represents an atmospheric pressure value sensed thereby. Controller 28 then calculates an atmospheric pressure calibration factor which correlates the pressure sensor signal value to the atmospheric pressure value.

Once the relief pressure value and the atmosphere pressure value associated with the hydraulic system are calibrated and captured, the controller 28 can determine all points in between based upon a straight line correlation, or based upon any other correlation programmed into the controller 28. While the semi-automatic calibration of hydraulic pressure sensor 22 has been described with respect to atmospheric pressure and relief pressure, it can be understood by one skilled in the art that any "low" and "high" pressure combination can be used.

Automatic Control Handle Calibration

Figure 2:
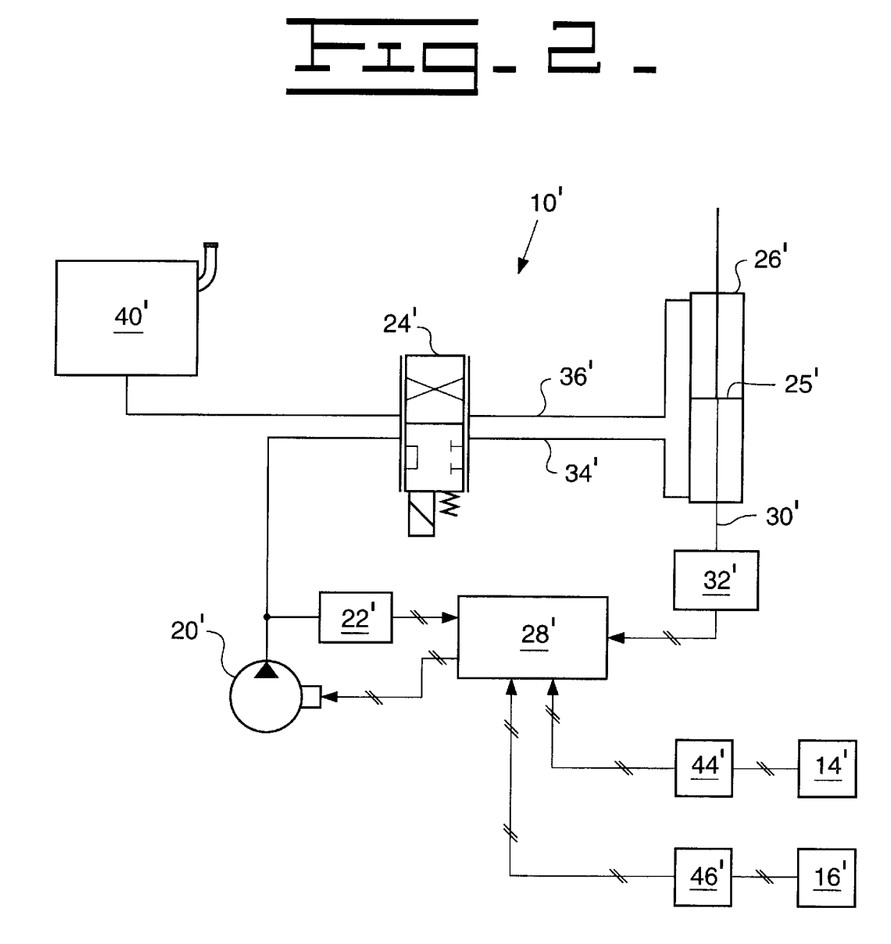
FIG. 2 is a block diagram of another embodiment of the calibration system of the present invention.

As previously discussed, controller 28' may also be configured to provide certain automatic calibrations wherein the work machine performs such calibrations automatically and dynamically without operator assistance during operation of the work machine whenever certain conditions are met. FIG. 2 represents the various components associated with such an embodiment of the present calibration system 10'. In this embodiment, controller 28' provides for an automatic blade control calibration process for automatically calibrating blade control handle 14', an automatic cylinder position sensor calibration process for automatically calibrating cylinder position sensor 32', and an automatic hydraulic pressure sensor calibration process for automatically calibrating hydraulic pressure sensor 22' for atmospheric pressure. With respect to automatic calibrations, controller 28' may also verify that the calibration factors determined through the calibration process are within a certain expected range before they are accepted. In one embodiment, controller 28' automatically verifies whether these pre-calibration conditions are met during the automatic calibration processes performed thereby.

1. Automatic Blade Control Handle Calibration

The automatic blade control handle calibration process will now be described. There are no pre-calibration conditions for this calibration process. The limit positions of the blade control handle 14' are generally associated with + or −100% of the travel angle in any particular direction. However, due to wear and tear of the mechanical components comprising the handle 14', the handle limit positions can change over time and exceed 100% of its initially assigned travel range. The automatic blade control handle calibration process accounts for such changes in the following manner.

When controller 28' receives blade control handle signals from blade control handle sensor 44', it correlates such signals to the proper corresponding travel angles of the blade control handle 14'. In a preferred embodiment, such correlation is provided via tables containing the necessary data relating to the travel angles of the blade control handle 14' in its various directions of movement stored within the memory of controller 28'. Controller 28' includes a comparator (not shown) for continually comparing the last stored travel angle for each limit position of blade control handle 14' with the current travel angle associated with each limit position. Controller 28' may also include a detector (not shown) in communication with the comparator for detecting a difference therebetween. In a preferred embodiment, the comparator and detector are implemented via software. Upon detection of a difference between a last stored limit position of handle 14' in a particular direction and a current limit position in the same direction, controller 28' stores the current limit position as the last stored limit position.

In one embodiment, the controller 28' receives blade control handle signals, associated with the travel angle of the blade control handle 14', from the blade control handle sensor 44'. The controller 28' may determine the travel angle of the blade control handle 14' in response to the current handle signals. The controller 28' compares the current travel angle, with the stored limit travel angle. If the current travel angle exceeds the stored limit travel angle, the current travel angle is stored as the new limit travel angle. Similarly, the controller 28' may compare the received current handle signals with a stored limit signal, and store the current handle signal when it exceeds the stored handle signal.

In a preferred embodiment, controller 28' does not store the current limit position as the last stored limit position unless the difference therebetween is within a predetermined range. With such a configuration, the actual position of blade control handle 14' can be accurately calibrated in a continuous and dynamic manner.

It is recognized and anticipated that the ripper control handle 16' can likewise be automatically and dynamically calibrated in a manner substantially similar to the calibration process explained above with respect to blade control handle 14'.

2. Automatic Cylinder Position Sensor Calibration

The automatic cylinder position sensor calibration process operates in a similar fashion to the automatic control handle calibration process. In the preferred embodiment, the pre-calibration conditions for this calibration process include the engine of the work machine to be running and set to high idle, and the hydraulic oil temperature to be in the operation temperature range. When controller 28' receives cylinder position sensor signals from cylinder position sensor 32', it correlates such signals to the proper corresponding travel positions of cylinder piston 25'. In a preferred embodiment, such correlation is likewise provided via tables stored within the memory of controller 28'. Controller 28' includes a comparator (not shown) for continually comparing the last stored travel distance for each limit position of piston 25' within cylinder 26' with the current travel distance associated with each limit position. Controller 28' may also includes a detector (not shown) in communication with the comparator for detecting a difference therebetween. In a preferred embodiment, the comparator and detector are implemented via software. Upon detection of a difference between a last stored limit position of piston 25' and a current limit position in the same direction, controller 28' stores the current limit position as the last stored limit position.

In one embodiment, the controller 28' receives cylinder position sensor signals, associated with the corresponding travel position of the cylinder piston 25', from the cylinder position sensor 32'. The controller 28' may determine the travel position of the cylinder piston 25' in response to the current position sensor signals. The controller 28' compares the current travel position, with the stored limit position. If the current travel position exceeds the stored limit travel position, the current travel position is stored as the new limit travel position. Similarly, the controller 28' may compare the received current position sensor signals with a stored limit signal, and store the current position sensor signal when it exceeds the stored position signal.

In a preferred embodiment, controller 28' does not store the current limit position as the last stored limit position unless the difference therebetween is within a predetermined range. With such a configuration, the actual position of cylinder 26' can be accurately determined in a continuous and dynamic manner.

3. Automatic Hydraulic Pressure Sensor Calibration

The automatic hydraulic pressure sensor calibration process comprises the automatic calibration for atmospheric pressure and it specifically correlates the output signal from hydraulic pressure sensor 22' to the value of the atmospheric pressure. In the preferred embodiment, the pre-calibration conditions for this calibration process includes the engine of the work machine to be off, and the oil pressure to be discharged in the implements and the hydraulic tank 40'. This calibration process is accomplished in the following manner.

To begin with, the atmospheric pressure of the location in which the particular work machine is used is inputted into and stored by controller 28'. Preferably, the atmospheric pressure is inputted via keypad 12 (see FIG. 1), but can be inputted via any operator input mechanism such as a touch screen. Controller 28' includes a comparator (not shown) for comparing the pressure sensor signal value of the pressure sensor signal generated by pressure sensor 22' to the atmospheric pressure value stored in controller 28'. Controller 28' also includes a detector (not shown) in communication with the comparator for detecting a difference between the actual atmospheric pressure and the atmospheric pressure stored within controller 28'. In a preferred embodiment, the comparator and detector are implemented via software. Upon detection of a predetermined difference between the actual and stored atmospheric pressure, controller 28' calculates an atmospheric pressure calibration factor representing the detected difference. The atmospheric pressure calibration factor is then used to correlate the pressure sensor signal value with the atmospheric pressure.

In one embodiment, once the pre-calibration process is complete, the controller begins the calibration procedure. As stated above, the atmospheric pressure is established. For example, the atmospheric pressure is preferably a specified value for a particular geographic location. A pressure sensor signal generated by the pressure sensor 22' is received by the controller 28'. The controller 28' correlates the pressure sensor signal with the established atmospheric pressure. The controller 28' may determine a pressure sensor calibration factor in response to the correlation. Then during normal operation, the pressure sensor calibration factor may be utilized with the sensed pressure signal to determine a current pressure reading of the pressure sensor 22'.

The described embodiments of the calibration process allows the work machine to automatically compensate for the atmospheric pressure associated with the physical location of the machine.

INDUSTRIAL APPLICABILITY

As described herein, the calibration systems of the present invention allow for more accurate control of the work machine and can be utilized in association with a wide variety of different work machines. In the case of the semi-automatic calibrations described herein, an operator of the work machine may use a service tool 48 to control the various calibrations. In particular, depending upon the type of calibration selected via service tool 48, and after the appropriate pre-calibration conditions, if any, have been verified by controller 28, controller 28 performs the calibration. Specifically, controller 28 correlates the actual state of the component being calibrated with that sensed by the relevant sensor. In the case of automatic calibrations, where no operator intervention is required, controller 28' dynamically compares the current state of the particular component being calibrated with its last stored state and calibrates the component based on any differences therebetween. Therefore, under both systems, while the tolerance of a certain component will change over time, they are calibrated such that their current state can always be accurately determined.

Electronic controllers or any other type of processor means such as controller 28 or 28' are commonly used in association with work machines and other devices for accomplishing various tasks. In this regard, controller 28 or 28' may typically include processing means such as a microcontroller or microprocessor, associated electronic circuitry such as input/output circuitry, analog circuits, or programmed logic arrays, as well as associated memory. Controller 28 or 28' can therefore be programmed to recognize and receive the appropriate signals from the various sensors and the various operator input mechanisms and, based upon such signals, calculate an appropriate calibration factor to achieve accurate control of the work machine.

Still further, the various sensors utilized in the present system such as hydraulic pressure sensor 22, cylinder position sensor 32, blade control handle sensor 44, ripper control handle sensor 46, hydraulic pressure sensor 22', cylinder position sensor 32', blade control handle sensor 44' and ripper control handle sensor 46' are well known in the art and a wide variety of different types of pressure sensors, cylinder position sensors, blade control handle sensors and ripper control handle sensors may be utilized in the present system without departing from the spirit and scope of the present invention.

As is evident from the foregoing description, certain aspects of the present invention are not limited to the particular details of the examples illustrated herein. It is therefore contemplated that other modifications and applications using other sensors and methods for calibration will occur to those skilled in the art. It is accordingly intended that all such modifications, variations and other uses and applications which do not depart from the sprit and scope of the present invention are deemed to be cover by the present invention.

Other aspects, objects and advantages of the present invention can be obtained from a study of the drawings, the disclosure and the appended claims.

What is claimed is:

1. A calibration system for a work machine using an electro hydraulic valve to control the operation of a work element, the work machine for use in a location having an atmospheric pressure, the valve being connected to the work element via a hydraulic circuit which includes actuator means coupled to the work element for controlling the operation thereof, the calibration system comprising:

a pressure sensor positioned in communication with the valve and adapted to sense a pressure being exerted against the work element, the pressure sensor outputting a pressure sensor signal having a pressure sensor signal value indicative of the sensed pressure; and a controller in communication with the pressure sensor and adapted to automatically and dynamically calibrate the pressure sensor signal value to the atmospheric pressure, the controller comprising:

storage means for storing the atmospheric pressure;

a comparator in communication with the pressure sensor and adapted to compare the stored atmospheric pressure to the pressure sensor signal value of the received pressure sensor signal at atmospheric pressure;

a detector in communication with the comparator and adapted to detect a difference between the stored atmospheric pressure and the compared pressure sensor signal value at atmospheric pressure; and a calculator adapted to calculate an atmospheric pressure calibration factor representing the detected difference such that accurate control of the pressure sensor is achieved.

2. The calibration system as set forth in claim 1 wherein the controller includes pre-calibration verification means for verifying a plurality of pre-calibration conditions during calibration of the pressure sensor.

3. A method of calibrating a pressure sensor of a work machine using an electro hydraulic valve to control the operation of a work element, the work machine for use in a location having an atmosphere pressure, the valve being connected to the work element via a hydraulic circuit which includes actuator means coupled to the work element for controlling the operation thereof, the pressure sensor positioned in communication with the valve and adopted to sense a pressure being exerted against the work element, the pressure sensor outputting a pressure sensor signal valve indicative of the sensed pressure, the method comprising the steps of:

storing a value indicative of an atmospheric pressure;

comparing the stored value indicative of the atmospheric pressure to the pressure sensor signal value of the pressure sensor signal at atmospheric pressure;

detecting a difference between the stored value indicative of the atmospheric pressure and the compared pressure sensor signal value at atmospheric pressure; and calculating an atmospheric pressure calibration factor representing the detected difference such that accurate control of the pressure sensor is achieved.

4. The method as set forth in claim 3, further comprising the step of verifying a plurality of the pre-calibration conditions.

5. A calibration system for a work machine using an electro hydraulic valve to control the operation of a work element, the work machine for use in a location having an atmospheric pressure, the valve being connected to the work element via a hydraulic circuit which includes actuator means coupled to the work element for controlling the operation thereof, the calibration system comprising:

a pressure sensor positioned in communication with the valve and adapted to sense a pressure being exerted against the work element, the pressure sensor outputting a pressure sensor signal having a pressure sensor signal value indicative of the sensed pressure; and a controller in communication with the pressure sensor and adapted to automatically and dynamically calibrate the pressure sensor signal value to the atmospheric pressure, the controller comprising:

storage means for storing the atmospheric pressure;

a comparator in communication with the pressure sensor and adapted to compare the stored atmospheric pressure to the pressure sensor signal value of the received pressure sensor signal at atmospheric pressure; and a calculator adapted to calculate an atmospheric pressure calibration factor in response to the stored atmospheric pressure and the received pressure sensor signal.

6. A method of calibrating a pressure sensor of a work machine using an electro hydraulic valve to control the operation of a work element, the work machine for use in a location having an atmosphere pressure, the valve being connected to the work element via a hydraulic circuit which includes actuator means coupled to the work element for controlling the operation thereof, the pressure sensor positioned in communication with the valve and adopted to sense a pressure being exerted against the work element, the pressure sensor outputting a pressure sensor signal valve indicative of the sensed pressure, the method comprising the steps of:

storing a value indicative of an atmospheric pressure;

comparing the stored value indicative of an atmospheric pressure to the pressure sensor signal value of the pressure sensor signal at atmospheric pressure; and calculating an atmospheric pressure calibration factor in response to said atmospheric pressure and said pressure sensor signal value.

* * * * *